United States Patent [19]

Watson et al.

[11] 4,059,533

[45] Nov. 22, 1977

[54] OXYGEN SCAVENGING METHODS AND ADDITIVES

[75] Inventors: Jimmie L. Watson; Leroy L. Carney, both of Duncan, Okla.

[73] Assignee: Halliburton Company, Duncan, Okla.

[21] Appl. No.: 518,306

[22] Filed: Oct. 29, 1974

[51] Int. Cl.$^2$ .................... C09K 7/02; C09K 7/04; E21B 43/22; C01B 17/66
[52] U.S. Cl. .................. 252/8.5 A; 175/64; 252/8.5 B; 252/8.55 B; 252/188
[58] Field of Search ............ 252/8.5 A, 8.5 B, 8.5 C, 252/8.55 D, 188; 166/279, 310; 175/64; 423/515, 512 R, 265

[56] References Cited

U.S. PATENT DOCUMENTS

| 1,810,663 | 6/1931 | Kritchevsky et al. | 252/188 |
|---|---|---|---|
| 1,810,665 | 6/1931 | Kritchevsky et al. | 252/188 |
| 2,702,789 | 2/1955 | Teichmann et al. | 252/8.5 |
| 2,718,497 | 9/1955 | Oldham et al. | 252/8.5 |
| 3,017,351 | 1/1962 | Scott et al. | 252/8.5 |
| 3,301,323 | 1/1967 | Parsons | 175/64 X |
| 3,343,601 | 9/1967 | Pye | 166/275 X |
| 3,399,725 | 9/1968 | Pye | 166/275 |
| 3,852,201 | 12/1974 | Jackson | 252/8.5 |

FOREIGN PATENT DOCUMENTS

| 6,414,645 | 6/1965 | Netherlands | 252/8.5 |
|---|---|---|---|

OTHER PUBLICATIONS

The Merck Index, Eighth Edition, Published 1968 by Merck and Co., Inc., pp. 958 and 960.

*Primary Examiner*—Herbert B. Guynn
*Attorney, Agent, or Firm*—Robert S. Nisbett; Thomas R. Weaver; John H. Tregoning

[57] ABSTRACT

This invention relates to methods and additives for scavenging oxygen dissolved and entrained in liquids which are particularly suitable for removing dissolved and entrained oxygen from polymer-containing fluids used in drilling and completing well bores as well as water flood and other procedures carried out in the oil field. The oxygen scavenger additive is sodium dithionite or a mixture thereof with sodium dithionate dispersed in a liquid carrier such as a hydrocarbon.

5 Claims, No Drawings

OXYGEN SCAVENGING METHODS AND ADDITIVES

The presence of dissolved and entrained oxygen in liquids utilized in industry is often detrimental in that the oxygen reacts with the exposed surfaces of equipment contacted by the liquids or reacts with other components contained in the liquids which in turn react with the surfaces causing corrosion and the deterioration thereof.

A particular problem of this type is encountered in the drilling and completing of well bores penetrating subterranean oil and/or gas producing formations. That is, drilling fluids circulated through the drill string and drill bit into the well bore often contain dissolved and entrained air which enters the drilling fluid as it is circulated through surface separating and screening equipment, mud pits, etc. The presence of oxygen from the air in the drilling fluids drastically increases the rate of corrosion and deterioration of metal surfaces in the drill string, casing and associated equipment as compared to drilling fluids which do not contain oxygen. The use of polymers in drilling fluids greatly increases the amount of entrained oxygen which is carried downhole during circulation.

While a variety of oxygen scavenger additives have been developed and used successfully with conventional drilling fluids containing dispersed solids, e.g., sodium sulfite catalyzed with a transition metal, hydrazine, sulfur dioxide dissolved in a carrier liquid and others, these heretofore used oxygen scavenger additives are relatively ineffective for removing dissolved and entrained oxygen from polymer type non-dispersed solids drilling fluids.

Aqueous polymer type drilling fluids have recently been developed and have several distinct advantages over conventional drilling fluids containing high solids dispersed with agents such as lignosulfonates. That is, aqueous drilling fluids containing a polymer component as a viscosifier, a polymer fluid loss component and a potassium chloride component, referred to generally as low solids non-dispersed drilling fluids, are advantageous in that less viscosifier and filter loss component is required than in high solids fluids and the cuttings produced in the drilling operation do not disperse in the drilling fluid making it possible to readily screen out such cuttings using surface screening equipment and to keep the solids content of the drilling fluid low. A low solids content in the drilling fluid is advantageous because less solids from the drilling fluid are placed between the drill bit and the earth formation being drilled, increasing the penetration rate.

The polymer component used in polymer non-dispersed drilling fluids generally is comprised of a polymer or copolymer having one or more substitutable carboxyl groups therein. Examples of such polymers are hydroxyethylcellulose, carboxymethyl hydroxyethylcellulose, copolymers of vinyl acetate and maleic anhydride, polyacrylate, polyacrylamide, and mixtures thereof. The addition of these polymers to an aqueous fluid provides viscosity and thixotropic properties thereto as well as friction loss characteristics.

The viscosifier and fluid loss component generally used is Wyoming bentonite (sodium montmorillonite) which when placed in the aqueous fluid hydrates and swells, adding viscosity to the fluid. In addition, the bentonite cakes out on the walls and the well bore thereby reducing fluid loss.

The potassium chloride component utilized in aqueous polymer drilling fluids functions to prevent the cuttings produced by the drill bit from swelling and being dispersed throughout the drilling fluid. This allows the cuttings to be readily screened out of the drilling fluid using conventional surface equipment and the solids content of the drilling fluid to be maintained at a desired low level.

As stated above, oxygen scavengers used heretofore are relatively ineffectual when used in polymer drilling fluids. This is primarily due to the oxygen reactive component of the scavenger preferentially reacting directly with the substitutable carboxyl groups of the polymer or the catalysts incorporated in the scavenger reacting therewith.

By the present invention methods and compositions for scavenging oxygen from liquids are provided which are particularly suitable for use in aqueous polymer type non-dispersed drilling fluids and other polymer fluids utilized in well bore drilling and completing procedures.

The oxygen scavenger additive of the present invention is comprised of an oxygen reactive material selected from the group of sodium dithionite, and mixtures thereof with sodium dithionate. These materials selectively react with dissolved oxygen in liquids including those containing polymers having substitutable carboxyl groups therein. While the sodium dithionite or mixtures thereof with sodium dithionate can be added directly to the liquid from which oxygen is to be scavenged, such materials are difficult to handle and present a fire hazard when exposed to the atmosphere.

In accordance with the present invention an oxygen scavenging additive is provided containing sodium dithionite or mixtures thereof with sodium dithionate suspended in a liquid carrier having the property of insulating the oxygen reactive materials from the atmosphere. The resulting additives can be safely handled and conveniently added to liquids from which oxygen is to be scavenged.

While a variety of carrier liquids can be utilized in the oxygen scavenging additive of the present invention, liquid aliphatic hydrocarbons, liquid aromatic hydrocarbons, and mixtures thereof are preferred. The most preferred liquid carrier is diesel oil.

The oxygen reactive materials are preferably added to the carrier liquid in an amount of from about 40 percent by weight to about 60 percent by weight. However, as will be understood, the oxygen reactive materials can be combined with the carrier liquid in any convenient amount so long as the carrier liquid retains its ability to insulate the reactive materials when the additive is exposed to the atmosphere.

The reactive materials can be dispersed in the carrier liquid in any convenient manner, preferably by sparging the reactive materials into the carrier liquid beneath the surface thereof to avoid contact with air. In order to maintain a dispersion of the reactive materials in the carrier liquid, thickening agents such as oleophillic clay, fused silica or dimerized saturated and unsaturated fatty acids can be added to the slurry. Preferably, fused silica is utilized as the thickening agent for the additive and is added thereto in an amount of about 1 percent by weight of the slurry.

A particularly preferred oxygen scavenger additive of the present invention is comprised of diesel oil present in an amount of about 53 percent by weight, a mixture of sodium dithionite and sodium dithionate present in an amount of about 46 percent by weight and fused silica present in an amount of about 1 percent by weight. The resulting additive can be safely handled and exposed to the atmosphere for periods of time without adverse results. In addition, the additive is pourable so that it can be immediately and conveniently combined with the liquid from which oxygen is to be scavenged.

While the oxygen scavenger additive of the present invention can be utilized for scavenging oxygen from aqueous, hydrocarbon and other liquids, it finds particular utility as an oxygen scavenger for polymer fluids and drilling fluids used in drilling and completing well bores penetrating subterranean formations. The oxygen reactive component of the additive, i.e., sodium dithionite or mixtures thereof with sodium dithionate preferentially react with oxygen in the presence of polymers containing substitutable carboxyl groups and potassium chloride. Further, the reaction does not require catalyzation and therefore obviates the problem experienced with conventional transition metal catalyzed scavengers.

The oxygen reactive component of the present invention is effective to reduce dissolved oxygen in aqueous solutions in an amount as low as 0.025 pounds per barrel of aqueous solution. However, increased concentrations of the reactive component in the liquid from which oxygen is to be scavenged increases the rate at which oxygen is removed.

In carrying out the method of the present invention, that is the method of removing dissolved oxygen from a liquid, the additive of the present invention is combined with the liquid in an amount effective to remove the dissolved oxygen content. If the liquid is saturated with dissolved oxygen and contains entrained oxygen or air, as the dissolved oxygen is removed the entrained oxygen becomes dissolved and is also removed.

As applied to well bore drilling operations, and particularly to such operations utilizing polymer type non-dispersed drilling fluids, a quantity of additive of the present invention is combined with the drilling fluid by batch mixing in the mud pit or by injecting the additive upstream or downstream of the mud pumps. A dissolved oxygen meter can be utilized to monitor the dissolved oxygen content of the drilling fluid entering the drill string and flowing therethrough into the well bore so that if oxygen is entrained and dissolved in the drilling fluid in surface equipment, mud pits, etc., the oxygen meter indicates such fact. In the case of polymer type non-dispersed drilling fluids wherein the solid cuttings are screened out of the drilling fluid in surface equipment, air entrainment readily occurs so that by the time the drilling fluid passes through the mud pits and other surface equipment to the mud pumps, it often contains both dissolved and entrained air. In order to overcome this problem, the oxygen scavenger additive of the present invention can be continuously added to the drilling fluid at a rate sufficient to react with and remove the dissolved and entrained oxygen contained therein. As will be understood, the additive can be added to the drilling fluid in any convenient manner including periodically batch mixing a quantity of the additive with the drilling fluid in the mud pits.

The additives of the present invention are useful in a variety of applications other than for scavenging oxygen from well drilling fluids. For example, polymer type fluids are presently utilized in secondary and ter- tiary oil and gas recovery operations as well as in other oil, gas and water well completion and production techniques. Moreover, the additives of the present invention have a universal application for scavenging oxygen from liquids and thereby preventing corrosion and chemical deterioration of surfaces contacted by the liquids. The additives are effective for the removal of oxygen at small concentrations and do not require catalysts or other ingredients for accelerating the oxygen reaction.

In order to further illustrate the methods and additives of the present invention, the following examples are given:

EXAMPLE 1

Oxygen scavenger additives of the present invention are prepared in the laboratory as follows:

Additive "A". 350 grams of a mixture of sodium dithionite and sodium dithionate are combined with 350 cc (294 grams) of diesel oil using a magnetic stirrer so that the sodium dithionite-dithionate mixture in the form of a dry powder is dispersed in the diesel oil. 10 grams of oleophillic clay are added to the mixture resulting in an oxygen scavenging additive containing 44.9 percent by weight diesel oil, 53.6 percent by weight sodium dithionite-dithionate mixture and 1.5 percent oleophillic clay.

Additive "B". 250 grams of the same sodium dithionite-dithionate mixture described above are added to 350 cc (294 grams) of diesel oil and 6 grams of fused silica thickener are added to the mixture resulting in an additive containing 53.4 percent by weight diesel oil, 46.5 percent by weight sodium dithionite-dithionate mixture and 1.1 percent fused silica.

A quantity of aqueous solution containing the equivalent of 10 pounds per barrel of Wyoming bentonite, 0.5 pounds per barrel of polyvinyl acetate-maleic anhydryde copolymer and 12 pounds per barrel of potassium chloride is prepared. Oxygen is dissolved in the aqueous fluid in the amount of 6.3 parts per million at 23° C. Samples of the aqueous fluid are tested for oxygen content at time intervals, the first sample containing no additive, the second sample containing the equivalent of 0.1 pounds per barrel of Additive "A" described above and the third sample containing the equivalent of 0.1 pounds per barrel of Additive "B" described above. The results of these tests are given in Table I below:

TABLE I

| | TIME vs. OXYGEN CONTENT OF AQUEOUS POLYMER-KCl SOLUTIONS | | | |
|---|---|---|---|---|
| Sample | Elapsed Time, Min. | Oxygen Scavenging Additive Used | Additive Concentration, Pounds Per Barrel | Temperature of Sample, °C | Dissolved Oxygen Content, ppm |
| 1 | 0 | None | None | 22.6 | 6.3 |
| 1 | 5 | None | None | 22.7 | 6.3 |
| 1 | 10 | None | None | 22.9 | 6.3 |
| 2 | 0 | Additive "A" | 0.1 | 22.9 | 2.0 |
| 2 | 5 | Additive "A" | 0.1 | 22.9 | 0.75 |
| 2 | 10 | Additive "A" | 0.1 | 23.0 | 0.75 |
| 2 | 20 | Additive "A" | 0.1 | 23.6 | 0.80 |
| 3 | 0 | Additive "B" | 0.1 | 23.0 | 2.0 |
| 3 | 5 | Additive "B[ | 0.1 | 23.1 | 0.35 |
| 3 | 10 | Additive "B" | 0.1 | 23.2 | 0.25 |
| 3 | 20 | Additive "B" | 0.1 | 23.8 | 0.10 |
| 3 | 30 | Additive "B" | 0.1 | 24.0 | 0.05 |

From Table I above it can be seen that the additives of the present invention when added to aqueous polymer solutions in small quantities effectively reduce the dissolved oxygen content thereof in short periods of time.

EXAMPLE 2

Various conventional oxygen scavengers are added to samples of the aqueous polymer containing solutions described in Example 1 above as are various quantities of an oxygen scavenging additive of the present invention, i.e., an additive comprised of 53 percent by weight diesel oil, 46 percent by weight of a mixture of sodium dithionite and sodium dithionate and 1 percent by weight fused silica thickening agent. Oxygen is first dissolved in the aqueous polymer containing solutions in an amount of 6.6 parts per million at 22° C, the additives are combined therewith and the solutions are tested for dissolved oxygen content immediately after combining the additives and at time intervals thereafter. The results of these tests are given in Table II below:

TABLE II

COMPARISON OF OXYGEN CONTENT REDUCING EFFECTIVENESS OF VARIOUS OXYGEN SCAVENGERS AND THE ADDITIVES OF THE PRESENT INVENTION IN AQUEOUS POLYMER-KCl SOLUTIONS

| Oxygen Scavenger Used | Concentration of Scavenger, Pounds/Barrel | Elapsed Time, min. | Temperature of Sample, °C | Dissolved Oxygen Content, ppm. |
|---|---|---|---|---|
| None | 0 | 0 | 22.0 | 6.6 |
|  | 0 | 5 | 22.4 | 6.4 |
|  | 0 | 10 | 22.5 | 6.4 |
| $SO_2$ Dissolved in | 0.2 | 0 | 21.2 | 6.0 |
| Carrier Liquid[1] | 0.2 | 5 | 21.6 | 0.7 |
|  | 0.2 | 10 | 23.0 | 0.6 |
| Mixture of Sodium Dithionite | 0.2 | 0 | 22.7 | 4.0 |
| and Sodium Dithionate[2] | 0.2 | 5 | 23.0 | 0.4 |
| (Added Directly to Aqueous Polymer-KCl Solution) | 0.2 | 10 | 23.3 | 0.2 |
| Sodium Sulfite Catalyzed With | 0.2 | 0 | 22.8 | 4.0 |
| Cobalt Chloride | 0.2 | 5 | 22.8 | 2.8 |
|  | 0.2 | 10 | 22.9 | 2.5 |
| Ferrous Aluminum Sulfate | 0.2 | 0 | 22.4 | 6.0 |
|  | 0.2 | 5 | 22.7 | 4.4 |
|  | 0.2 | 10 | 22.9 | 4.7 |
| Reaction Product of $H_2S$ | 0.2 | 0 | 22.8 | 6.1 |
| and an Aldehyde[3] | 0.2 | 5 | 22.8 | 5.0 |
|  | 0.2 | 10 | 23.0 | 4.7 |
| Additive of Present | 0.437[5] | 0 | 22.9 | 2.0 |
| Invention[4] | 0.437 | 5 | 23.0 | 0 |
|  | 0.437 | 10 | 23.1 | 0 |
| Additive of Present | 0.218[6] | 0 | 22.2 | 4.75 |
| Invention | 0.218 | 5 | 23.4 | 0 |
|  | 0.218 | 10 | 23.8 | 0 |
| Additive of Present | 0.109[7] | 0 | 23.2 | 5.1 |
| Invention | 0.109 | 5 | 23.8 | 0.35 |
|  | 0.109 | 10 | 24.1 | 0.25 |
| Additive of Present | 0.054[8] | 0 | 23.0 | 4.6 |
| Invention | 0.054 | 5 | 23.1 | 2.0 |
|  | 0.054 | 10 | 23.7 | 0.25 |

[1] A product marketed under the tradename CORTRON RDF-101 by Champion Chemical Co. of Houston, Texas.
[2] A product marketed under the tradename VISCO P-35-C by Nalco Chemical Co. of Houston, Texas.
[3] Described in U.S. Pat. No. 3,669,613.
[4] VISCO P-35-C suspended in diesel oil with fused silica thickener.
[5] Sodium Dithionite-Dithionate mixture present in test solution in amount of 0.2 pounds per barrel.
[6] Sodium Dithionite-Dithionate mixture present in test solution in amount of 0.1 pounds per barrel.
[7] Sodium Dithionite-Dithionate mixture present in test solution in amount of 0.05 pounds per barrel.
[8] Sodium Dithionite-Dithionate mixture present in test solution in amount of 0.025 pounds per barrel.

From the test results shown in Table II, it can be seen that the oxygen scavenging additives of the present invention are more effective in removing oxygen from aqueous polymer-potassium chloride solutions than the other scavengers tested and that the additives of the present invention are effective for removing the oxygen at very low concentrations.

What is claimed is:

1. A method of maintaining the oxygen concentration in an aqueous fluid at a very low concentration comprising; adding to said aqueous fluid an oxygen scavenging composition comprising a carrier liquid having dispersed therein sodium dithionite or a mixture thereof with sodium dithionate, said carrier liquid containing a thickening agent to suspend therein said sodium dithionite or a mixture of sodium dithionite with sodium dithionate, wherein said carrier liquid is selected from the group consisting of liquid aliphatic hydrocarbon, liquid aromatic hydrocarbon and mixtures thereof.

2. A method of claim 1 in which the aqueous fluid is a drilling or completion fluid.

3. A method of claim 1 in which the aqueous fluid is a drilling fluid which contains a polymer selected from the group consisting of hydroxyethylcellulose, carboxymethyl hydroxyethylcellulose, copolymer of vinyl acetate and maleic anhydride, polyacrylate, polyacrylamide and mixtures thereof.

4. A method of claim 1 in which the sodium dithionite or mixture of sodium dithionite with sodium dithionate is present in an amount of at least 0.025 pounds per barrel of aqueous fluid.

5. A method of claim 1 in which the concentration of sodium dithionite or a mixture of sodium dithionite with sodium dithionate is present in said carrier liquid in an amount of about 40–60% by weight of said oxygen scavenging composition.

* * * * *